(12) United States Patent
Bertmar

(10) Patent No.: US 12,142,051 B2
(45) Date of Patent: Nov. 12, 2024

(54) CONTROLLING CAMERA-BASED SUPERVISION OF A PHYSICAL SPACE

(71) Applicant: ASSA ABLOY AB, Stockholm (SE)

(72) Inventor: Ingrid Bertmar, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 382 days.

(21) Appl. No.: 17/771,619

(22) PCT Filed: Oct. 20, 2020

(86) PCT No.: PCT/EP2020/079495
§ 371 (c)(1),
(2) Date: Apr. 25, 2022

(87) PCT Pub. No.: WO2021/078736
PCT Pub. Date: Apr. 29, 2021

(65) Prior Publication Data
US 2022/0415052 A1    Dec. 29, 2022

(30) Foreign Application Priority Data

Oct. 25, 2019   (SE) ..................................... 1951220-1

(51) Int. Cl.
G06V 20/52      (2022.01)
G08B 13/196     (2006.01)
G08B 21/04      (2006.01)

(52) U.S. Cl.
CPC ....... *G06V 20/52* (2022.01); *G08B 13/19686* (2013.01); *G08B 21/0476* (2013.01)

(58) Field of Classification Search
CPC ................ G06V 20/52; G06V 40/161; G08B 13/19686; G08B 21/0476; G08B 25/008;
(Continued)

(56) References Cited

U.S. PATENT DOCUMENTS 9,922,540 B1    3/2018   Hutz
2002/0071033 A1   6/2002  Gutta et al.
(Continued)

FOREIGN PATENT DOCUMENTS

CN    110336978    10/2019
EP    2407944      1/2012
(Continued)

OTHER PUBLICATIONS

Anonymous "What are modes and rules and how does Arlo use them?" Arlo, Sep. 20, 2019, 4 pages [retrieved online Jan. 13, 2021 from kb.arlo.com/42/What-are-modes-and-rules-and-how-does-Arlo-use-them].

(Continued)

*Primary Examiner* — Huy C Ho

(74) *Attorney, Agent, or Firm* — Schwegman Lundberg & Woessner, P.A.

(57) ABSTRACT

It is provided a method for controlling camera-based supervision of a physical space. The method is performed in a supervision controller and comprises the steps of: determining that a person enters the physical space; deactivating camera-based supervision of the physical space based on the person entering the physical space, by turning off a video feed of the camera-based supervision; determining that a person exits the physical space; and activating camera-based supervision of the physical space based on the person exiting the physical space.

20 Claims, 2 Drawing Sheets

(58) Field of Classification Search
CPC .......... H04N 7/18; H04N 23/61; H04N 7/188; H04N 23/611; G07C 9/00
USPC ........................................................ 382/103
See application file for complete search history.

(56) References Cited

U.S. PATENT DOCUMENTS

| | | | |
|---|---|---|---|
| 2005/0129272 | A1 | 6/2005 | Rottman et al. |
| 2006/0005045 | A1* | 1/2006 | Nakase ................. G07C 9/257 713/190 |
| 2010/0328460 | A1 | 12/2010 | Merkel et al. |
| 2011/0150327 | A1 | 6/2011 | Yoo et al. |
| 2015/0350612 | A1 | 12/2015 | Brunson et al. |
| 2016/0125714 | A1 | 5/2016 | Kates et al. |
| 2016/0189529 | A1* | 6/2016 | Lee ......................... H04W 4/02 340/541 |
| 2016/0275781 | A1 | 9/2016 | Nold |
| 2017/0134895 | A1* | 5/2017 | Rabb ..................... G08B 29/24 |

FOREIGN PATENT DOCUMENTS

| | | |
|---|---|---|
| JP | 2005-004256 | 1/2005 |
| JP | 2006-304250 | 11/2006 |
| JP | 2011-130271 | 6/2011 |
| JP | 2011-138409 | 7/2011 |
| JP | 2018-037951 | 3/2018 |
| WO | WO 2013/137534 | 9/2013 |

OTHER PUBLICATIONS

Anonymous "Twitter—Ring announcement on the introduction of Modes," Twitter, Sep. 26, 2019, 1 page [retrieved online Jan. 13, 2021 from: twitter.com/ring/status/1176986909685403648?lang=eng].
Official Action for Sweden Patent Application No. 1951220-1, dated Apr. 17, 2020, 8 pages.
Official Action for Sweden Patent Application No. 1951220-1, dated Oct. 6, 2021, 5 pages.
International Search Report and Written Opinion for International (PCT) Patent Application No. PCT/EP2020/079495, dated Jan. 22, 2021, 17 pages.
Written Opinion of the International Preliminary Examining Authority for International (PCT) Patent Application No. PCT/EP2020/079495, dated Oct. 1, 2021, 11 pages.
International Preliminary Report on Patentability for International (PCT) Patent Application No. PCT/EP2020/079495, dated Feb. 8, 2022, 22 pages.
"International Application Serial No. PCT EP2020 079495, Response to Written Opinion filed Aug. 24, 2021 to Written Opinion mailed Jan. 22, 2021", 10 pages.
"International Application Serial No. PCT EP2020 079495, Response to Written Opinion filed Dec. 1, 2021 to Written Opinion mailed Oct. 1, 2021", 8 pages.

* cited by examiner

CONTROLLING CAMERA-BASED SUPERVISION OF A PHYSICAL SPACE

CROSS REFERENCE TO RELATED APPLICATIONS

This application is a national stage application under 35 U.S.C. 371 and claims the benefit of PCT Application No. PCT/EP2020/079495 having an international filing date of Oct. 20, 2020, which designated the United States, which PCT application claimed the benefit of Sweden Patent Application No. 1951220-1 filed Oct. 25, 2019, the disclosure of each of which are incorporated herein by reference.

TECHNICAL FIELD

The present disclosure relates to the field of camera-based supervision and in particular to controlling camera-based supervision of a physical space.

BACKGROUND

Camera-based supervision is increasing in popularity. Camera-based supervision can e.g. be used for health supervision of elderly people or for supervision of children at a school or day-care centre. In this way, a local or remote operator can determine when there are problems which may need to be addressed, either in person or by remotely controlling equipment at the physical space being supervised. Such camera-based supervision typically requires explicit approval by the people being supervised, or legal guardians of children being supervised.

However, on occasion, external people may enter the physical space being supervised. Such external people may not have approved to be captured on a video feed for supervision, or simply do not wish to be captured on such a video feed.

SUMMARY

One object is to improve how camera-based supervision is controlled when external people enter a physical space being supervised using a camera.

According to a first aspect, it is provided a method for controlling camera-based supervision of a physical space. The method is performed in a supervision controller and comprises the steps of: determining that a person enters the physical space; deactivating camera-based supervision of the physical space based on the person entering the physical space, by turning off a video feed of the camera-based supervision; determining that a person exits the physical space; and activating camera-based supervision of the physical space based on the person exiting the physical space.

The step of determining that a person enters the physical space may comprise receiving a signal from an electronic lock that the lock is triggered to be unlocked.

The step of determining that a person exits the physical space may comprise receiving a signal from an electronic lock that the lock is triggered to be locked.

The signal from the electronic lock may comprise an indicator of the user triggering the lock actuation.

The deactivating may be performed based the indicator of the user is not indicative of the user having approved to be supervised.

The step of determining that a person enters the physical space may comprise receiving a signal from a person detector provided by a doorway into the physical space.

The step of determining that a person exits the physical space may comprise receiving a signal from a person detector provided by a doorway into the physical space.

According to a second aspect, it is provided a supervision controller for controlling camera-based supervision of a physical space. The supervision controller comprises: a processor; and a memory storing instructions that, when executed by the processor, cause the supervision controller to: determine that a person enters the physical space; deactivate camera-based supervision of the physical space based on the person entering the physical space, by turning off a video feed of the camera-based supervision; determine that a person exits the physical space; and activate camera-based supervision of the physical space based on the person exiting the physical space.

The step of deactivating may comprise turning off image capturing of a camera used for the camera-based supervision.

The instructions to determine that a person enters the physical space may comprise instructions that, when executed by the processor, cause the supervision controller to receive a signal from an electronic lock that the lock is triggered to be unlocked.

The instructions to determine that a person exits the physical space may comprise instructions that, when executed by the processor, cause the supervision controller to receive a signal from an electronic lock that the lock is triggered to be locked.

The signal from the electronic lock may comprise an indicator of the user triggering the lock actuation.

The instructions to deactivate may comprise instructions that, when executed by the processor, cause the supervision controller to perform the deactivation based the indicator of the user is not indicative of the user having approved to be supervised.

The instructions to determine that a person enters the physical space may comprise instructions that, when executed by the processor, cause the supervision controller to receive a signal from a person detector provided by a doorway into the physical space.

The instructions to determine that a person exits the physical space may comprise instructions that, when executed by the processor, cause the supervision controller to receive a signal from a person detector provided by a doorway into the physical space.

According to a third aspect, it is provided a computer program for controlling camera-based supervision of a physical space. The computer program comprises computer program code which, when run on a supervision controller causes the supervision controller to: determine that a person enters the physical space; deactivate camera-based supervision of the physical space based on the person entering the physical space, by turning off a video feed of the camera-based supervision; determine that a person exits the physical space; and activate camera-based supervision of the physical space based on the person exiting the physical space.

The instructions to deactivate may comprise instructions that, when executed by the processor, cause the supervision controller to turn off image capturing of a camera used for the camera-based supervision.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
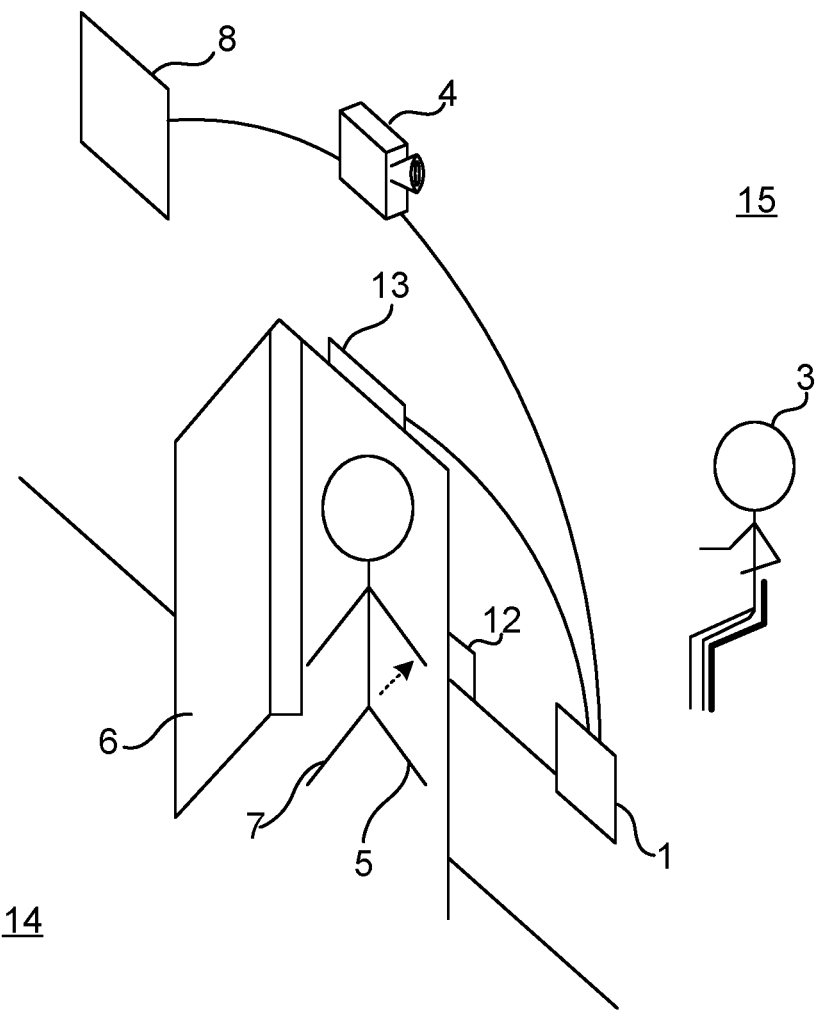
FIG. 1 is a schematic diagram illustrating an environment in which embodiments presented herein can be applied.

FIG. 1 is a schematic diagram illustrating an environment in which embodiments presented herein can be applied. Access to a first physical space 15 from a second physical space 14 is restricted by a door 6. The door 6 is provided in a doorway 5 between the first physical space 15 and the second physical space 14. In order to control access in either or both direction between the physical spaces 14, 15 an electronic lock 12 can be provided to thereby selectively unlock and lock the door 6. Alternatively, a pure mechanical lock can be provided. The first physical space 15 can be a room, a flat, a building, a garden, etc.

Inside the first physical space 15 is a user 3 which has approved camera-based supervision based on a camera 4 provided in or by the first physical space 15. The camera 4 enables supervision of the first physical space 15 by providing a video feed of at least part of the first physical space 15 to a supervisor 8. The supervisor 8 can be a machine-based supervision equipment, or a local or remote display for showing the video feed from the camera 4 to a human operator, with or without storing the video feed for later reference.

The camera-based supervision can e.g. be used for health state supervision of the user 3 being an elderly person, in which case, the first physical space can be the home of the user 3. Alternatively, the camera-based supervision can be used for supervision of children at a school or day-care centre, in which case the first physical space is the grounds of the school/day-care centre or the building of the school/day-care centre. The user 3 is then each one of the children, in which case the legal guardians of the children have approved the camera-based supervision.

While the user 3 (or legal guardian of the user) have approved the camera-based supervision, an external person 7 may enter the first physical space 15. In embodiments presented herein, an external person 7 is one that has not approved the camera-based supervision.

For this purpose, a supervision controller 1 is provided. As explained in more detail below, when someone enters the first physical space 15, the supervision controller 1 temporarily deactivates the camera-based supervision. When the external person 7 exits again, the supervision controller 1 again activates the camera-based supervision.

The determination of the external person 7 entering and exiting the first physical space 15 can be based on the electronic lock 12. Alternatively, the determination of the external person entering and exiting the first physical space 15 can be based on an optional person detector 13 provided by the doorway 5. The person detector 13 is capable of detecting the presence of a person 7 and optionally the direction in which the person moves. The person detector 13 can e.g. be based on radar, infrared camera, etc.

It is to be noted that the supervision controller 1 can be physically housed within other equipment, such as within the camera 4 or the electronic lock 12.

Figure 2:
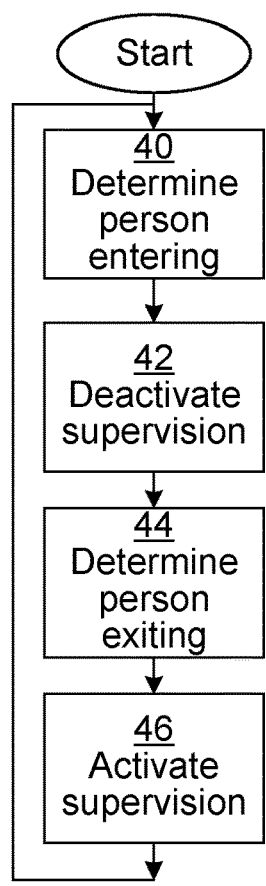
FIG. 2 is a flow chart illustrating embodiments of methods for controlling camera-based supervision of a physical space.

FIG. 2 is a flow chart illustrating embodiments of methods for controlling the camera-based supervision of a physical space, such as the first physical space 15 of FIG. 1.

In a determine person entering step 40, the supervision controller determines that a person enters the physical space.

The supervision controller can determine that a person enters the physical space based on receiving a signal from an electronic lock that the lock is triggered to be unlocked.

Alternatively, the supervision controller can determine that a person enters the physical space based on receiving a signal from a person detector provided by a doorway into the physical space.

In a deactivate supervision step 42, the supervision controller deactivates camera-based supervision of the physical space based on the person entering the physical space. The deactivation is performed by turning off a video feed of the camera-based supervision. Optionally, the deactivation comprises turning off image capturing of a camera used for the camera-based supervision.

In any case, this step completely deactivates the camera-based supervision of the physical space, thus positively ensuring that the person entering the physical space will not be supervised using the camera-based supervision.

In a determine person exiting step 44, the supervision controller determines that a person exits the physical space.

The supervision controller can determine that a person exits the physical space based on receiving a signal from an electronic lock that the lock is triggered to be locked.

Alternatively, the supervision controller can determine that a person exits the physical space based on receiving a signal from a person detector provided by a doorway into the physical space.

In an activate supervision step 46, the supervision controller activates camera-based supervision of the physical space based on the person exiting the physical space. This can e.g. comprise turning on the video feed from the camera and/or turning on image capturing by the camera.

Any signal (i.e. a lock signal or unlock signal) from the electronic lock can comprises an indicator of the user triggering the lock actuation. The indicator can e.g. be a user identifier. This allows the supervision controller to use a lookup table to determine whether the user identifier is a user that has approved to be supervised. The lookup table can e.g. contain user identifiers of users that have approved to be supervised. In other words, the step of deactivating 42 can be performed based the indicator of the user is not indicative of the user having approved to be supervised. Considering the example of home supervision of an elderly person, the supervision controller can in this way distinguish between if the elderly person comes home from being out and when a cleaner enters the physical space to clean the home. In other words, the user identifier can be used to determine when a person entering or exiting the first physical space is an external person, defined as a person that has not approved to be the subject of camera-based supervision.

Optionally, a counter of external people within the first physical space is used, such that the counter is increased each time an external person enters, and the counter is decreased each time an external person exits. In this case, only when the counter reaches zero is the camera-based supervision activated.

Figure 3:
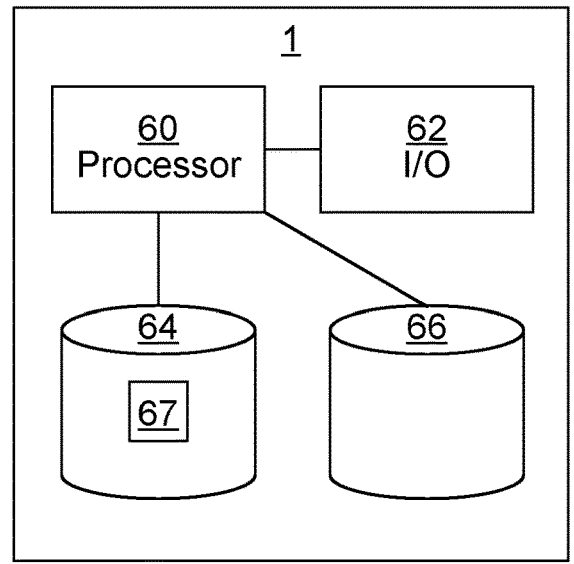
FIG. 3 is a schematic diagram illustrating components of the supervision controller of FIG. 1.

FIG. 3 is a schematic diagram illustrating components of the supervision controller 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The supervision controller 1 further comprises an I/O interface 62 for communicating with external and/or internal entities. Optionally, the I/O interface 62 also includes a user interface.

Other components of the supervision controller 1 are omitted in order not to obscure the concepts presented herein.

Figure 4:
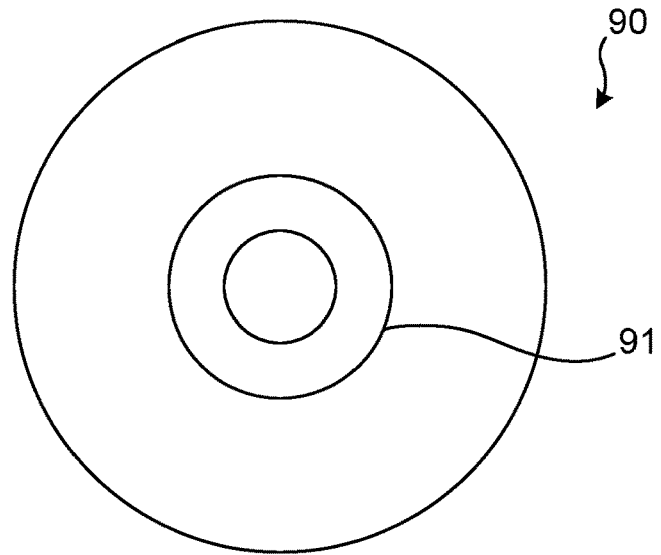
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments, enumerated with roman numerals.

i. A method for controlling camera-based supervision of a physical space, the method being performed in a supervision controller and comprising the steps of:
determining that a person enters the physical space;
deactivating camera-based supervision of the physical space based on the person entering the physical space;
determining that a person exits the physical space; and
activating camera-based supervision of the physical space based on the person exiting the physical space.

ii. The method according to embodiment i, wherein the step of determining that a person enters the physical space comprises receiving a signal from an electronic lock that the lock is triggered to be unlocked.

iii. The method according to embodiment i or ii, wherein the step of determining that a person exits the physical space comprises receiving a signal from an electronic lock that the lock is triggered to be locked.

iv. The method according to embodiment ii or iii, wherein any signal from the electronic lock comprises an indicator of the user triggering the lock actuation.

v. The method according to embodiment i, wherein the step of determining that a person enters the physical space comprises receiving a signal from a person detector provided by a doorway into the physical space.

vi. The method according to embodiment i or v, wherein the step of determining that a person exits the physical space comprises receiving a signal from a person detector provided by a doorway into the physical space.

vii. A supervision controller for controlling camera-based supervision of a physical space, the supervision controller comprising:
a processor; and
a memory storing instructions that, when executed by the processor, cause the supervision controller to:
determine that a person enters the physical space;
deactivate camera-based supervision of the physical space based on the person entering the physical space;
determine that a person exits the physical space; and
activate camera-based supervision of the physical space based on the person exiting the physical space.

viii. The supervision controller according to embodiment vii, wherein the instructions to determine that a person enters the physical space comprise instructions that, when executed by the processor, cause the supervision controller to receive a signal from an electronic lock that the lock is triggered to be unlocked.

ix. The supervision controller according to embodiment vii or viii, wherein the instructions to determine that a person exits the physical space comprise instructions that, when executed by the processor, cause the supervision controller to receive a signal from an electronic lock that the lock is triggered to be locked.

x. The supervision controller according to embodiment viii or ix, wherein any signal from the electronic lock comprises an indicator of the user triggering the lock actuation.

xi. The supervision controller according to embodiment vii, wherein the instructions to determine that a person enters the physical space comprise instructions that, when executed by the processor, cause the supervision controller to receive a signal from a person detector provided by a doorway into the physical space.

xii. The supervision controller according to embodiment vii or xi, wherein the instructions to determine that a person exits the physical space instructions that, when executed by the processor, cause the supervision controller to receive a signal from a person detector provided by a doorway into the physical space.

xiii. A computer program for controlling camera-based supervision of a physical space, the computer program comprising computer program code which, when run on a supervision controller causes the supervision controller to:
determine that a person enters the physical space;

deactivate camera-based supervision of the physical space based on the person entering the physical space;

determine that a person exits the physical space; and activate camera-based supervision of the physical space based on the person exiting the physical space.

xiv. A computer program product comprising a computer program according to embodiment xiii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for controlling camera-based supervision of a user in a physical space, the method being performed in a supervision controller and comprising:

determining that an external person enters the physical space;

deactivating camera-based supervision of the user in the physical space based on the external person entering the physical space, by turning off a video feed of the camera-based supervision;

determining that an external person exits the physical space; and activating camera-based supervision of the user in the physical space based on the external person exiting the physical space.

2. The method according to claim 1, wherein deactivating comprises turning off image capturing of a camera used for the camera-based supervision.

3. The method according to claim 1, wherein determining that an external person enters the physical space comprises receiving a signal from an electronic lock that the lock is triggered to be unlocked.

4. The method according to claim 3, wherein the signal from the electronic lock comprises an indicator of the external person triggering the lock actuation.

5. The method according to claim 4, wherein the deactivating is performed based on the indicator of the external person being indicative of the external person not having approved to be supervised.

6. The method according to claim 1, wherein determining that an external person exits the physical space comprises receiving a signal from an electronic lock that the lock is triggered to be locked.

7. The method according to claim 1, wherein determining that an external person enters the physical space comprises receiving a signal from a person detector provided by a doorway into the physical space.

8. The method according to claim 1, wherein determining that an external person exits the physical space comprises receiving a signal from a person detector provided by a doorway into the physical space.

9. The method according to claim 1, wherein determining that an external person enters the physical space comprises receiving a signal from a person detector capable of detecting a presence of the external person.

10. The method according to claim 1, wherein determining that an external person exits the physical space comprises receiving a signal from a person detector capable of detecting a presence of the external person.

11. A supervision controller for controlling camera-based supervision of a user in a physical space, the supervision controller comprising:

a processor; and a memory storing instructions that, when executed by the processor, cause the supervision controller to:

determine that an external person enters the physical space;

deactivate camera-based supervision of the user in the physical space based on the external person entering the physical space, by turning off a video feed of the camera-based supervision;

determine that an external person exits the physical space; and activate camera-based supervision of the user in the physical space based on the external person exiting the physical space.

12. The supervision controller according to claim 11, wherein the instructions to deactivate comprise instructions that, when executed by the processor, cause the supervision controller to turn off image capturing of a camera used for the camera-based supervision.

13. The supervision controller according to claim 11, wherein the instructions to determine that an external person enters the physical space comprise instructions that, when executed by the processor, cause the supervision controller to receive a signal from an electronic lock that the lock is triggered to be unlocked.

14. The supervision controller according to claim 13, wherein the signal from the electronic lock comprises an indicator of the external person triggering the lock actuation.

15. The supervision controller according to claim 14, wherein the instructions to deactivate comprise instructions that, when executed by the processor, cause the supervision controller to perform the deactivation based on the indicator of the external person being indicative of the external person not having approved to be supervised.

16. The supervision controller according to claim 11, wherein the instructions to determine that an external person exits the physical space comprise instructions that, when executed by the processor, cause the supervision controller to receive a signal from an electronic lock that the lock is triggered to be locked.

17. The supervision controller according to claim 11, wherein the instructions to determine that an external person enters the physical space comprise instructions that, when executed by the processor, cause the supervision controller to receive a signal from a person detector provided by a doorway into the physical space.

18. The supervision controller according to claim 11, wherein the instructions to determine that an external person exits the physical space comprise instructions that, when executed by the processor, cause the supervision controller to receive a signal from a person detector capable of detecting a presence of the external person.

19. The supervision controller according to claim 11, wherein the instructions to determine that an external person enters the physical space comprise instructions that, when executed by the processor, cause the supervision controller to receive a signal from a person detector capable of detecting a presence of the external person.

20. A non-transitory computer-readable medium comprising a computer program product stored thereon for controlling camera-based supervision of a user in a physical space, the computer program product comprising computer program code which, when run on a supervision controller causes the supervision controller to:
- determine that an external person enters the physical space;
- deactivate camera-based supervision of the user in the physical space based on the external person entering the physical space, by turning off a video feed of the camera-based supervision;
- determine that an external person exits the physical space; and
- activate camera-based supervision of the user in the physical space based on the external person exiting the physical space.

* * * * *